Figure 1:
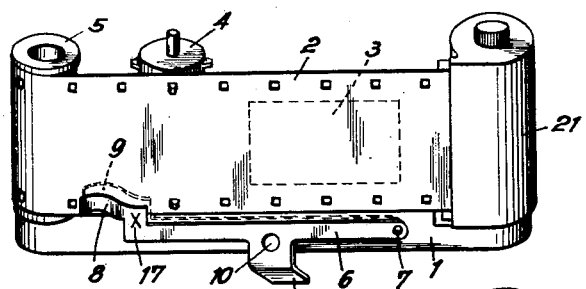

Nov. 27, 1956  H. NAUMANN  2,771,825
LOCKING MEANS FOR THE BACK WALL OF ROLL FILM CAMERAS
Filed Dec. 9, 1952  3 Sheets-Sheet 1

INVENTOR
Helmut Naumann
BY
Moser Kleem
ATTORNEYS

Nov. 27, 1956 H. NAUMANN 2,771,825
LOCKING MEANS FOR THE BACK WALL OF ROLL FILM CAMERAS
Filed Dec. 9, 1952 3 Sheets-Sheet 2

INVENTOR
Helmut Naumann
BY Moser-Klemm
ATTORNEYS

Nov. 27, 1956 H. NAUMANN 2,771,825
LOCKING MEANS FOR THE BACK WALL OF ROLL FILM CAMERAS
Filed Dec. 9, 1952 3 Sheets-Sheet 3

United States Patent Office 2,771,825
Patented Nov. 27, 1956

2,771,825

LOCKING MEANS FOR THE BACK WALL OF ROLL FILM CAMERAS

Helmut Naumann, Braunschweig, Germany, assignor to Voigtlander, A. G., Braunschweig, Germany, a corporation of Germany Application December 9, 1952, Serial No. 324,975

Claims priority, application Germany December 15, 1951

3 Claims. (Cl. 95—31)

This invention relates to locking means for the back wall of roll film cameras, and more particularly to locking means of this type, which prevent opening or removal of the camera back wall as long as sensitive film lies freely within the camera.

In many photographic cameras, it cannot be directly seen from the outside whether the camera contains a film, or not. In roll film cameras containing a film and its paper roll, the presence of numbers which are printed on the paper and visible through the red window, indicates the presence of a film in the camera. However, there will be no clear indication of this type if the number is inadvertently shifted from the area of the window, because it is difficult to see the film through the red window in the absence of a printed symbol. In minature cameras, in which the film is used without a paper roll, winding of the film is necessary in order to find out whether the supply spool is rotated simultaneously and this can be seen in recent camera constructions from the outside. If winding of the film is locked, a blank exposure must be made. The picture counting mechanism does not give, in general, clear information on the presence of a film in the camera. In view of these uncertainties, the camera is often opened erroneously and valuable pictures may then be lost by the action of light. Similar damage may be caused if a camera containing a film is opened inadvertently or by unauthorized persons.

It has been suggested previously to use locking means for the rear wall of roll film cameras in order to prevent plainly inadvertent opening of the camera. These locking means try to increase attentiveness by the use of certain signs or the like. They cannot prevent opening, so that errors and mistakes are not eliminated by them.

The above described disadvantages are overcome according to the present invention by installing in the camera a device which prevents removal of or opening the camera back wall as long as the sensitive film lies freely in the camera, either because it is not completely exposed or because it has not been wound back yet to the film holder.

The device according to the present invention consists of a locking means which is directly or indirectly actuated or controlled by the film or by an element moved together with the film. The main part of the device according to the invention is a contact member which is arranged articulately or elastically on the camera body or the camera back wall and is held by the film, which is in position for exposure, in a first position which is different from the position of said member in the empty camera. In said first position, said contact member locks the camera back wall so that it cannot be directly opened, while in said other position of the contact member the back wall is released for opening. However, the arrangement contains locking means acting in one way in such manner that the back wall can be closed when a film is inserted in the camera. Therefore, said locking means, or an element connected therewith, has preferably such design, e. g. the form of a pawl, that the camera back wall can be closed, but not opened, when the camera contains a film.

Actuation of the locking means can take plae at any part of the camera. For example, locking can be effected by a film portion adjacent to or on the take up spool or supply spool.

Furthermore, it is possible to effect locking by means of a member actuated by the film. For example, the locking means may comprise a tongue elastically fastened to the camera casing, said tongue being provided with a contact element lying laterally against the film surface and with an aperture. Upon swinging to the locking position, said tongue prevents opening of the back wall by engaging with its aperture a locking pin, whereby an inclined flap provided on the tongue permits closing of the back wall, but not its opening after engagement of the aperture by the pin, when the camera contains a film.

According to another embodiment, the locking device includes a contact lever which is rotatable about an axis parallel with the direction of movement of the film, said lever lying against the rear side of the film and being adapted to lock at least one locking bolt of the camera back wall by means of a second lever and a cam.

In a further embodiment of the invention, the member locking the back wall is not controlled directly by the film, but by another camera element, the position of which is unequivocally and positively dependent on the film, e. g. the picture counting device. In this embodiment, a contact member bears preferably against a drum connected with the picture counting device, said contact member being adapted to lock the camera back wall as long as the picture counter is not at zero, i. e. when a film is in the camera, while a recess in the drum surface permits release of locking when the camera is empty and the counter indicates "0."

The invention also includes an additional device, which can be actuated by hand and actuation of which under exceptional conditions renders locking inactive if the camera containing a film must be opened, e. g. in order to remove part of the film in the dark room, or if—irrespective of the loss of exposed films—opening of the camera is necessary in order to eliminate some trouble. However, according to the invention, this additional device cannot be actuated directly and needs the use of an auxiliary means or tool, e. g. a screw driver, pin, coin, or the like.

In using such additional device, a lever, which can be turned by means of a slotted head from the outside, may be fastened to the inner surface of the back wall, said lever being adapted to temporarily render locking inactive, by means of a pawl-like member arranged on the locking tongue, e. g. an inclined starting surface. According to another embodiment, contact lever and locking lever can be arranged in such manner that they can be displaced along their common axis of rotation, against the action of a spring, to a non-locking position, by means of a tool acting from the outside.

In some motion-picture cameras locking means have been used, which permit opening of the camera by means of a coin. However, these known devices are not dependent in their operation in any way on the position of the film or on the presence of a film in the camera. They are mechanical locks and have nothing to do with the release of a locking device.

It is useful to indicate the position of the contact member on the outside of the closed camera, in order to indicate whether the camera contains a film. In conventional miniature cameras this could be recognized only by causing transport of the film and observing the back winding knob or other outwardly projecting parts of the film transporting mechanism.

Some embodiments of the invention are diagrammatically illustrated in the appended drawings and described in the following examples, to which the invention is not limited. Details which are not necessary for the understanding of the invention have been omitted in these examples and the drawings.

Figure 2:
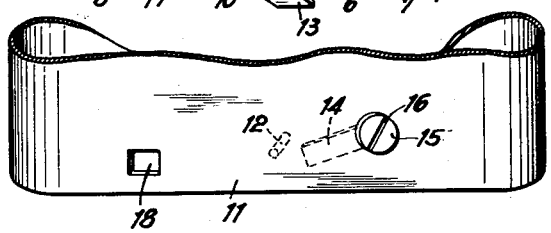
Figure 3:
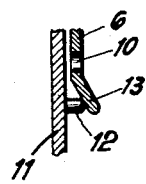
Figure 4:
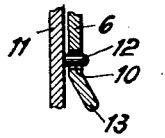
Figure 5:
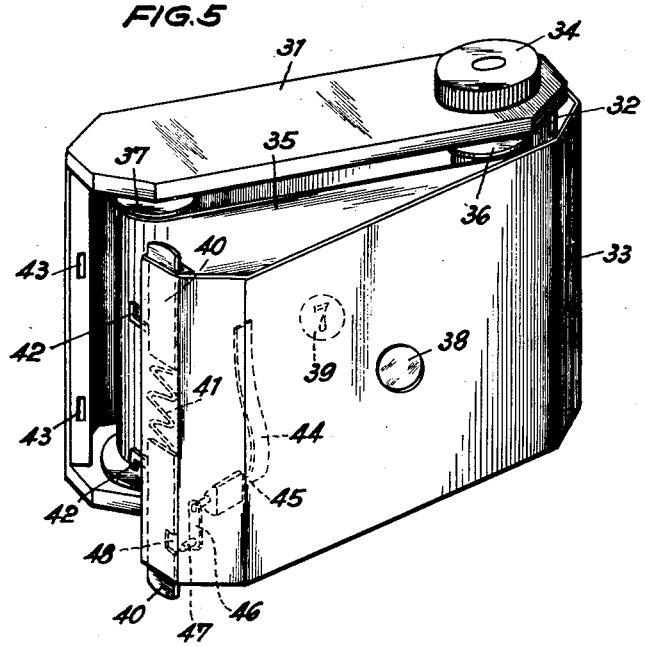
Figure 6:
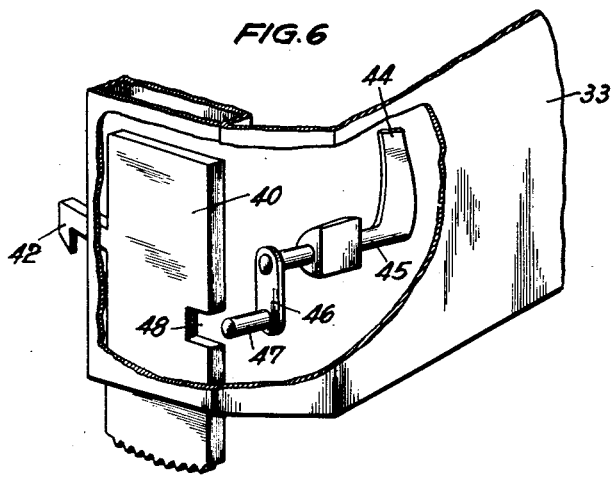
Figure 7:
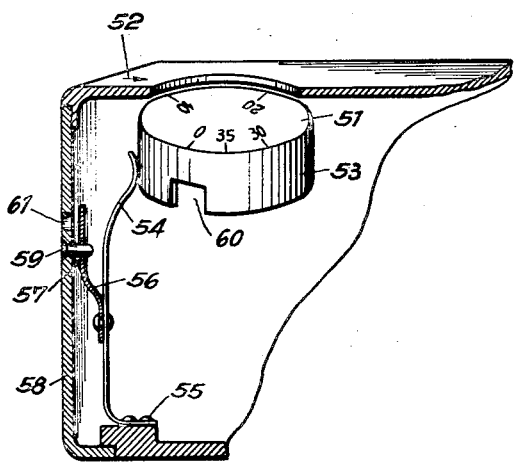

In the drawings, Figure 1 diagrammatically illustrates in perspective view the interior of a miniature camera for perforated film; Figure 2 is a similar view of a part of a camera back wall which is adapted to be assembled with the camera shown in Figure 1; Figure 3 illustrates locking elements of the camera shown in Figures 1 and 2, in open position, while Figure 4 illustrates the locking elements shown in Figure 3 in locked position; Figure 5 illustrates a roll film camera with an open folding back wall; Figure 6 illustrates in perspective view, on an enlarged scale, the locking mechanism of the camera shown in Figure 5; Figure 7 diagrammatically illustrates, in perspective view, locking means cooperating with the counting mechanism of a camera.

Referring now to the drawings in detail, in Figure 1, reference symbol 1 denotes the camera body. The film 2 is conducted from film holder 21 along picture window 3, showing in dotted line, and is advanced by toothed drum 4, which serves as a transport roll, by elements not shown, each time after taking a picture and is finally taken up by spool 5. An elastic tongue 6 is fastened at 7 to the camera body 1. Said tongue is provided on its free end with an upwardly extending arched contact member 8, which lies against film 2, preferably at the perforations only and in any case beyond the film area to be exposed, in order to eliminate the danger of scratching the film. As long as no film is inserted in the camera, tongue 6 occupies position 9 shown in dotted line, owing to the elasticity of said tongue. If, however, a film is inserted in the camera, the tongue is pressed or moved by the film in outward direction, i. e. in the direction of the viewer of the drawing. Thereby aperture 10 provided in tongue 6 engages pin 12 in the manner diagrammatically shown in Figures 3 and 4, so that said aperture becomes engaged by said pin 12, which is arranged on the removable back wall 11 of the camera. This back wall 11 is shown in Figure 2 in a position resulting from sliding off the back wall in downward direction. Owing to the engagement of pin 12 and aperture 10 in closed position of the back wall, the latter cannot be directly removed. However, inclined flap 13, which is provided below aperture 10 as a starting surface, permits to slide on the back wall when the camera contains a film, whereby a temporary elastic deflection of elastic tongue 6 takes place.

Contact member 8 preferably projects into the winding space of spool 5, so that back wall 11 remains locked even after film 2 has been completely taken up by spool 5 so that there is no film between spool 5 and toothed roll 4. This happens when, by inappropriate handling of the camera, film 2 has been torn out from the film holder and the film is completely wound up on spool 5. In this case, contact member 8 is held by spool 5 in the position shown in Figure 1 in continuous line. However, under normal conditions, even after complete exposure, the film will still extend from spool 5 over toothed roll 4 and window 3 into film holder 21 and can be wound back to the film holder, until the starting portion of the film is removed from the space between members 4 and 5. As soon as this happens, lever 6 returns to rest position 9, shown in dotted line, aperture 10 releases pin 12 and back wall 11 can be opened or removed in order to remove from film holder 21 the exposed film which is housed by said film holder and protected from light therein.

In order to permit opening of the camera containing a film under exceptional conditions, a lever 14 is provided on the inner surface of back wall 11, as shown in Figure 2. A rotatable part of said lever extends through the camera back wall and is provided on the outside with a flat disc 15 having a slot 16 adapted to be operated by means of a coin or a screw-driver. By means not shown in the drawing, e. g. elastic washers, movement of lever 14 is braked by friction to such extent that the lever cannot be operated by a fingernail, or the like, without the use of a tool. By turning said lever by means of a tool in clockwise direction in closed position of the camera, the lever bears against inclined flap 13 of tongue 6 and thus causes disengagement of aperture 10 from pin 12 (see Figure 4), so that the camera can be opened. By stops, not shown in the drawing, movement of lever 14 can be limited and by the use of a spring the lever can be held in unoperative condition in a rest position.

Tongue 6 can be provided with a sign 17 in order to render it recognizable from the outside whether the camera is empty or contains a film, said sign being capable of being observed through window 18 which is provided in the back wall of the camera and may be closed by ground glass. If the camera contains a film, sign 17 lies tightly against window 18 and the sign will be plainly visible. In an empty camera the sign is spaced from the window and is either not, or only hardly, visible behind the ground glass.

Figures 5 and 6 illustrate use of the invention in a roll film camera having a hinged back wall which can be snapped open as shown in Figure 5. Camera 31, shown in Figure 5 in rear view, is provided with a back wall 33 connected with the camera by means of hinge 32. 34 denotes a rotatable knob for causing transport of the film 35 and the supporting paper layer of the film. 36 is the take up spool, 37 denotes the supply spool and 38 denotes the usually red-colored window provided in the back wall of the camera for viewing the symbols printed on the paper strip of the film. In conventional manner, the back wall can be closed by two flap-shaped locking elements 40, which are provided on the narrow side of the back wall and are pressed apart by the action of spring 41. Said locking means 40 are each provided with a hook 42 adapted to engage recesses 43 provided in the camera. The locking means according to the invention comprises a contact lever 44, which is shown in dotted line in Figure 5, is arranged behind back wall 33 and rotatable about axis 45. This axis carries a second lever 46 provided with a tooth 47. In the empty camera, lever 44 is pressed, by a spring not shown, into the space for spool 37 and tooth 47 is removed from recess 48 of locking means 40, so that said locking means can be operated. Upon inserting a film in the camera and closing the camera, lever 44 is pressed by the film against the plane of the back wall, tooth 47 engages recess 48 and thus prevents operation of locking means 40 and opening of the camera.

Lever 44 can be provided with additional means or have a design suitable for supporting flat position of the film. In order to eliminate the effect of the locking device under exceptional circumstances, tooth 47 can be pressed back in the direction of the camera back wall through a hole (not shown in the drawing) provided in the outer wall of part 33, by means of a pointed tool, e. g. a pencil or a match, so that locking means 40 can be operated subsequently.

In the embodiment illustrated in Figure 7, the locking means according to the invention is controlled by drum 51 of the picture-counting device. This drum is positively connected with the taking up spool of the camera in such manner that index 52 points to "0" when there is no film on the spool. An elastic contact member 54 bears against the cylindrical surface of the drum. Said member 54 is firmly connected with the camera at 55 and carries a spring leaf 56 provided with an aperture 57. Camera back wall 58 can be closed by sliding it on from below. It is provided with a pin 59 which engages aperture 57 when the back wall is assembled with the camera. If counting device 51 points to "0," contact member 54 can enter recess 60 provided in cylindrical wall 53 of the drum, so that aperture 57 releases pin 59 and the camera back wall. By means of a pointed tool or other auxiliary means, engagement between aperture 57 and pin 59 can be released under exceptional circumstances, even if the camera is loaded, by pressing back spring 56 through aperture 61.

A device of the type here described can be applied also to film counting devices, the graduated disc of which is operated by a step by step control device and can be set by hand when the camera is loaded. In this case, the camera can be opened in loaded condition after the counter has been set to "0" so that particular means for opening the camera under exceptional conditions, are not necessary.

It will be understood that devices according to the invention, which are controlled by the film counter, can be applied also to cameras having a hinged back wall.

It will be also understood that this invention is not limited to the specific elements, arrangements and other specific details described above and illustrated in the drawings and can be carried out with various modifications without departing from the scope of the invention as defined in the appended claims.

What is claimed is:

1. Means for preventing the inadvertent opening of the rear wall of a roll film camera adapted to receive a film extending between a film holder and a take-up spool within the camera, said means being arranged within the camera and comprising an elongated resilient member fastened to the body of said camera and provide with a contact portion adapted to engage a lateral portion of the film surface, said resilient member being effective at a right angle to the surface of film to urge said contact portion into engagement with the film surface, a stud carried on the inner surface of the camera rear wall, said resilient member having an aperture adapted to receive said stud, said resilient member being urged, upon contact with the film, into a position such that said stud is positioned in the aperture, said resilient member having an inclined flap adjacent the aperture to provide an abutting surface adjacent said stud.

2. Means for preventing inadvertent opening of the rear wall of a roll film camera, as claimed in claim 1, in which the contact member has printed thereon a symbol visible in locked position of the rear wall of the camera, through a ground glass plate of a window provided in said rear wall.

3. The combination in accordance with claim 1 further comprising a lever rotatably arranged on the camera rear wall, said lever carrying a slotted knob on the outer surface of the camera rear wall, for effecting rotation of said lever, said lever being adapted to engage, upon being rotated, said inclined flap, in order to release engagement of said aperture and pin and thus temporarily release locking of the rear wall.

References Cited in the file of this patent

UNITED STATES PATENTS

| | | |
|---|---|---|
| 666,556 | Prentice | Jan. 22, 1901 |
| 1,389,164 | Roikjer | Aug. 30, 1921 |
| 1,655,525 | Underwood | Jan. 10, 1928 |
| 1,705,027 | Peters | Mar. 12, 1929 |
| 1,864,100 | Steiner | June 21, 1932 |
| 2,186,633 | Drotning | Jan. 9, 1940 |
| 2,266,426 | Koszalka et al. | Dec. 16, 1941 |
| 2,331,658 | Crumrine | Oct. 12, 1943 |
| 2,504,323 | Gillespie | Apr. 18, 1950 |
| 2,544,647 | Barnes | Mar. 13, 1951 |
| 2,591,417 | Frye | Apr. 1, 1952 |

FOREIGN PATENTS

| | | |
|---|---|---|
| 1,017,339 | France | Sept. 17, 1952 |